(12) United States Patent
Arai

(10) Patent No.: US 12,730,284 B2
(45) Date of Patent: Sep. 8, 2026

(54) CEMENTED OPTICAL ELEMENT, OPTICAL APPARATUS, AND IMAGE PICKUP APPARATUS

(71) Applicant: CANON KABUSHIKI KAISHA, Tokyo (JP)

(72) Inventor: Kazuhiro Arai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 446 days.

(21) Appl. No.: 18/184,452

(22) Filed: Mar. 15, 2023

(65) Prior Publication Data

US 2023/0296866 A1 Sep. 21, 2023

(30) Foreign Application Priority Data

Mar. 18, 2022 (JP) ................................ 2022-043720

(51) Int. Cl.
*G02B 13/00* (2006.01)
*B32B 3/26* (2006.01)
(Continued)

(52) U.S. Cl.
CPC ............ *G02B 13/006* (2013.01); *B32B 3/266* (2013.01); *H04N 23/51* (2023.01); *H04N 23/55* (2023.01); *B32B 7/12* (2013.01); *B32B 17/10733* (2013.01); *B32B 17/10743* (2013.01); *B32B 27/08* (2013.01); *B32B 27/308* (2013.01);
(Continued)

(58) Field of Classification Search
CPC ...... G02B 13/006; G02B 13/00; B32B 3/266; B32B 7/12; B32B 17/10733; B32B 17/10743; B32B 27/08; B32B 27/308; B32B 27/325; B32B 27/38; B32B 2255/10; B32B 2255/20; B32B 2255/205;
(Continued)

(56) References Cited

U.S. PATENT DOCUMENTS 5,024,509 A * 6/1991 Kurihara ................ G02B 7/022 359/741
11,630,286 B2 * 4/2023 Kanzaki ................ G02B 7/021 359/796
(Continued)

FOREIGN PATENT DOCUMENTS

JP H11268500 A 10/1999
JP 2005148591 A 6/2005
(Continued)

OTHER PUBLICATIONS

Examiner provided machine translation of Yanagisawa et al., CN 208026893 U) (Year: 2018).*
(Continued)

*Primary Examiner* — Balram T Parbadia
(74) *Attorney, Agent, or Firm* — Canon U.S.A., Inc. IP Division

(57) ABSTRACT

A cemented optical element having a first optical component, a second optical component, and a third optical component that contains a resin and is sandwiched between the first optical component and the second optical component. The first optical component contains a resin and has a line unevenness structure on at least a part of a surface in contact with the third optical component. The fine unevenness structure is formed by a plurality of holes or columnar protrusions.

9 Claims, 7 Drawing Sheets

(51) Int. Cl.

| | |
|---|---|
| ***H04N 23/51*** | (2023.01) |
| ***H04N 23/55*** | (2023.01) |
| *B32B 7/12* | (2006.01) |
| *B32B 17/10* | (2006.01) |
| *B32B 27/08* | (2006.01) |
| *B32B 27/30* | (2006.01) |
| *B32B 27/32* | (2006.01) |
| *B32B 27/38* | (2006.01) |

(52) U.S. Cl.
CPC ............. *B32B 27/325* (2013.01); *B32B 27/38* (2013.01); *B32B 2255/10* (2013.01); *B32B 2255/20* (2013.01); *B32B 2255/205* (2013.01); *B32B 2255/28* (2013.01); *B32B 2307/416* (2013.01); *B32B 2551/00* (2013.01)

(58) Field of Classification Search
CPC .......... B32B 2255/28; B32B 2307/416; B32B 2551/00; B32B 3/26; H04N 23/51; H04N 23/55
See application file for complete search history.

(56) References Cited

U.S. PATENT DOCUMENTS

| | | | | |
|---|---|---|---|---|
| 2018/0217350 | A1* | 8/2018 | Matsumoto | ............ C03C 27/10 |
| 2020/0124826 | A1* | 4/2020 | Kitsunezuka | .......... H04N 23/55 |
| 2020/0341169 | A1 | 10/2020 | Nakamatsu | |

FOREIGN PATENT DOCUMENTS

| | | | |
|---|---|---|---|
| JP | 2005157119 | A | 6/2005 |
| JP | 2007206490 | A | 8/2007 |
| JP | 2010197798 | A | 9/2010 |
| JP | 2010281876 | A | 12/2010 |
| JP | 2016210177 | A | 12/2016 |
| JP | 2020106628 | A | 7/2020 |
| WO | 2016063915 | A1 | 4/2016 |

OTHER PUBLICATIONS

Examiner provided machine translation of Shirai et al., JP 2005157119 A (Year: 2005).*
Examiner provided machine translation of Harada et al., JP 2007206490 A (Year: 2007).*

* cited by examiner

CEMENTED OPTICAL ELEMENT, OPTICAL APPARATUS, AND IMAGE PICKUP APPARATUS

BACKGROUND OF THE INVENTION

Field of the Invention

The present disclosure relates to a cemented optical element and an optical apparatus and an image pickup apparatus using the cemented optical element.

Description of the Related Art

As a method for joining a plurality of optical elements such as lenses, in the optical axis direction, a method for filling a transparent adhesive between the optical elements has been conventionally known.

In the case of a cemented lens including a lens with a large coefficient of linear thermal expansion, the radial stress applied to the joining surface increases due to an increase in the amount of expansion or shrinkage of the lens due to a temperature change. This has led to problems such as lens distortion and separation at the joining surface. In particular, in the case of resin lenses, lens separation occurs more prominently because a resin lens generally has the large coefficient of thermal expansion and is relatively weakly bonded to an adhesive. Furthermore, there has been a problem of loss of the amount of transmitted light due to the light reflection at the adhesive interface depending on the difference in refractive indices between the lens and the transparent adhesive.

Japanese Patent Application Laid-Open No. 2005-157119 describes a cemented optical element in which a fine unevenness structure is formed at the joining interface. Specifically, it describes that the reflection at the interface between the lenses is reduced by setting the refractive index of an adhesive used for joining lenses with widely different refractive indices to the middle of the refractive indices of the optical elements to be joined and providing cone-like protrudes on the lens surface in a shorter period than the visible light wavelength.

However, since the cone-like protrude has a thin tip, the cone-like protrude in the cemented optical element described in Japanese Patent Application Laid-Open No. 2005-157119 is easily fractured by the curing shrinkage of the adhesive. In particular, in the case of resin lenses, there has been a problem that the cone-like protrudes are remarkably fractured due to the low rigidity, and separation at the joining surface occurs.

SUMMARY OF THE INVENTION

The present disclosure is directed to a cemented optical element with high joint strength and low reflectivity at the joining interface.

A cemented optical element of the present disclosure is a cemented optical element including a first optical component, a second optical component, and a third optical component that contains a resin and is sandwiched between the first optical component and the second optical component, wherein the first optical component contains a resin and has a fine unevenness structure on at least a part of a surface in contact with the third optical component, and wherein the fine unevenness structure is formed by a plurality of holes or columnar protrusions.

Further features of the present disclosure will become apparent from the following description of exemplary embodiments with reference to the attached drawings.

BRIEF DESCRIPTION OF THE DRAWINGS

FIG. 6A is a diagram for illustrating a cemented optical element of Comparative Example 1.

FIG. 6B is a diagram for illustrating a part of a fine unevenness structure of the cemented optical element of FIG. 6A.

DESCRIPTION OF THE EMBODIMENTS

Cemented Optical Element

A cemented optical element of the present disclosure will be described below with reference to the following embodiments, but the present disclosure is not limited to the following embodiments.

First Embodiment

Figure 1A:
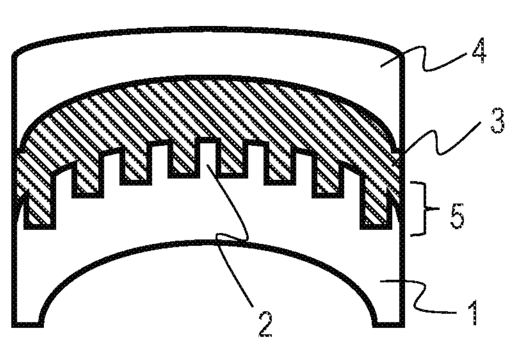
FIG. 1A is a diagram for illustrating a cemented optical element of the first embodiment.
Figure 1B:
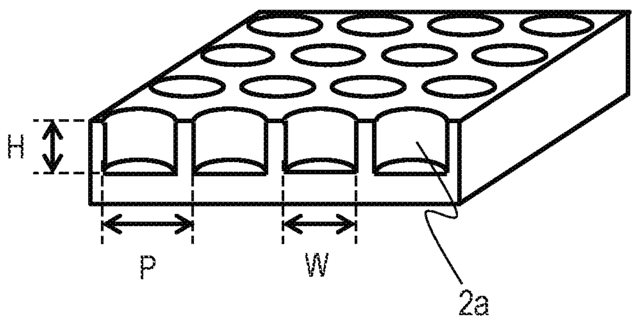
FIG. 1B is a diagram for illustrating a part of a fine unevenness structure of the cemented optical element of FIG. 1A.

The first embodiment of the present disclosure will be described with reference to FIG. 1A and FIG. 1B. FIG. 1A is a schematic sectional view of a cemented optical element of the present embodiment, and FIG. 1B is a schematic perspective view for illustrating a part of a fine unevenness structure of the cemented optical element of FIG. 1A. The fine unevenness structure is formed on a curved surface, while in FIG. 1B, it is simplified and illustrated as a flat surface.

The cemented optical element in FIG. 1A includes a first optical component 1, a second optical component 4, and a third optical component 3 that contains a resin and is sandwiched between the first optical component 1 and the second optical component 4.

The first optical component 1 is preferably a resin lens. As the material for the resin lens, any material may be used as long as the material has a transmittance of 90% or more at the wavelength of the light to be used and can be injection-molded, and for use in the visible light wavelength range, for example, a cycloolefin polymer resin (COP), a polystyrene resin (PS), an acrylic resin such as a polymethyl methacrylate resin (PMMA), a polycarbonate resin (PC) and the like can be used.

The second optical component 4 is preferably a glass lens or a resin lens. The material for the glass lens is not particularly limited, and for example, general optical glass represented by silicate glass, borosilicate glass and phosphate glass; quartz glass; and glass ceramics can be used depending on the desired optical performance. The material for the resin lens is the same as that of the first optical component 1.

The third optical component 3 is a joining resin layer joining the first optical component 1 and the second optical component 4. The joining resin layer is preferably a layer formed by curing the adhesive used for joining the first optical component 1 and the second optical component 4. As the adhesive, any adhesive can be used as long as the adhesive has a transmittance of 90% or more at the wavelength of the light to be used, and for use in the visible light wavelength range, for example, an epoxy adhesive and an acrylic adhesive can be used. The thickness of the third optical component 3 is not particularly limited; the thickness is preferably 5 μm or more and 40 μm or less, and more preferably 8 μm or more and 30 μm or less.

The first optical component 1 is provided with a fine unevenness structure 2 on at least a part, preferably all, of the surface in contact with the third optical component 3. When the second optical component 4 is a resin lens, the second optical component 4 is preferably provided with the fine unevenness structure on at least a part of the surface in contact with the third optical component 3. In FIG. 1B, the fine unevenness structure 2 is formed by a plurality of column-shaped holes (columnar holes) 2*a*. The shape of each of the columnar holes 2*a* may be a cylindrical shape as shown in FIG. 1B, or any other columnar shape such as a prismatic shape or an elliptical cylinder-shape, as long as the width W is almost constant in the depth H direction. In FIG. 1B, the columnar holes 2*a* are provided so that the depth H direction (center axis in depth H direction) is parallel to the vertical direction (optical axis direction), but the direction of each of the columnar holes 2*a* is not limited to this. The fine unevenness structure 2 is preferably a periodic structure.

The upper limit of the average value of the pitch P of the columnar holes 2*a* is preferably set so that diffracted light is unlikely to occur at the maximum angle of incidence of the light rays to be used. The upper limit of the average value of the pitch P of the columnar holes 2*a* is preferably set so that diffracted light is unlikely to occur at the wavelength of the light to be used. In the visible light wavelength range, the average value of the pitch P is preferably 300 nm or less and more preferably 250 nm or less. The lower limit of the average value of the pitch P is preferably set so that it is easy to form the fine unevenness structure by injection molding, and the average value of the pitch P is preferably 50 nm or more and more preferably 100 nm or more.

The depth H of each of the columnar holes 2*a* (height of bump part) is preferably 30 nm or more and 200 nm or less, more preferably 30 nm or more and 100 nm or less. When the depth H is 30 nm or more, sufficient joint strength can be ensured and separation at the joining interface between the first optical component 1 and the third optical component 3 is unlikely to occur. In addition, when the depth H is 200 nm or less, fracture of the fine unevenness structure 2 due to the curing shrinkage of the adhesive is unlikely to occur, and as a result, separation at the joining interface is unlikely to occur. Furthermore, when the depth H is 100 nm or less, fracture of the fine unevenness structure 2 is unlikely to occur even when used in a severe environment such that where the temperature changes rapidly.

Since the width W of each of the columnar holes 2*a* is appropriately determined by the wavelength to be used and the refractive indices of the first optical component 1 and the third optical component 3, the optimum range varies depending on the combination of these components. However, it is preferable that the width (P-W) of the thinnest part of the bump part of the first optical component 1 is 20 nm or more. The width (P-W) of the thinnest part of the bump part of the first optical component 1 can be paraphrased as the shortest distance between the two of the columnar holes 2*a* adjacent to each other. When the width (P-W) of the thinnest part is 20 nm or more, the fine unevenness structure 2 is less likely to fracture due to the curing shrinkage of the adhesive, and as a result, separation at the joining interface is unlikely to occur.

The method for forming the fine unevenness structure 2 is not particularly limited. For example, it can be formed by injection molding using a mold in which the inverted structure of the fine unevenness structure 2 is formed. FIGS. 2A to 2G are schematic sectional views for illustrating the forming step of the fine unevenness structure 2 of the cemented optical element of FIG. 1A. The details of the method for forming the fine unevenness structure 2 will be described in Examples.

In the cemented optical element of the present embodiment, the area of the joining surface between the first optical component 1 and the third optical component 3 is increased due to the presence of the fine unevenness structure 2, so that the joint strength can be increased. In addition, the fine unevenness structure 2 is formed by a plurality of holes, and the walls between the holes (bump parts) form a continuum, so that the rigidity is high. For this reason, it is considered that the fine unevenness structure 2 is not fractured when the adhesive is cured and shrunk, and separation at the joining interface does not occur during the joining step.

In addition, the adhesive penetrates into the dent part of the fine unevenness structure 2 (columnar holes 2*a*). The third optical component 3 has an inverted structure of the fine unevenness structure 2 on the surface in contact with the first optical component 1. By making the average pitch of the fine unevenness structure 2 sufficiently shorter than the wavelength of the light, the fine unevenness structure 2 and the fine unevenness structure layer 5 configured of the inverted structure of the fine unevenness structure 2 can be treated as a layer having the composite refractive index of the refractive indices of the first optical component 1 and the third optical component 3. The composite refractive index can be freely controlled between the refractive indices of the first optical component 1 and the third optical component 3 by controlling the dimensions of the fine unevenness structure 2. Reflection of light occurs due to the difference in refractive indices when light passes through the interface of materials with different refractive indices, but since the fine unevenness structure layer 5 functions as an anti-reflection layer, the reflectivity at the joining surface between the first optical component 1 and the third optical component 3 can be reduced.

As described above, the cemented optical element of the present embodiment has a high joint strength between the first optical component 1 and the third optical component 3 and a low reflectivity at the joining interface between the first optical component 1 and the third optical component 3, in addition, when the second optical component 4 is a resin lens and the surface of the second optical component 4 in contact with the third optical component 3 is provided with a fine unevenness structure, the joint strength between the second optical component 4 and the third optical component 3 is high and the reflectivity at the joining interface between the second optical component 4 and the third optical component 3 is low.

Second Embodiment

Figure 3A:
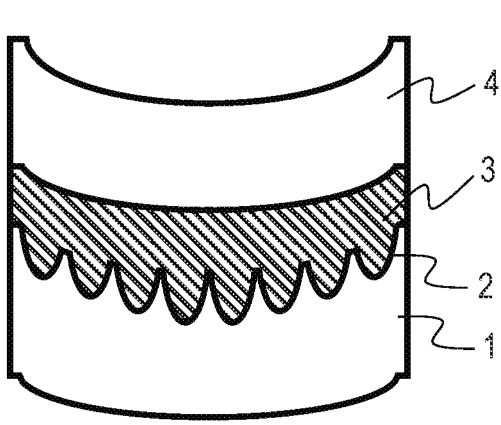
FIG. 3A is a diagram for illustrating a cemented optical element of the second embodiment.
Figure 3B:
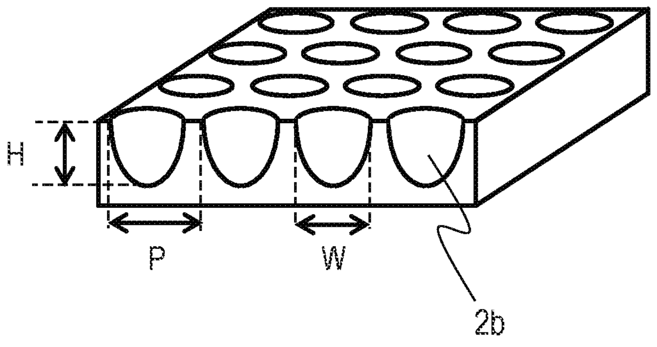
FIG. 3B is a diagram for illustrating a part of a fine unevenness structure of the cemented optical element of FIG. 3A.

The second embodiment of the present disclosure will be described with reference to FIG. 3A and FIG. 3B. The parts already described in the first embodiment are given the same references and the redundant explanation is omitted. FIG. 3A is a schematic sectional view of a cemented optical element of the present embodiment, and FIG. 3B is a schematic perspective view for illustrating a part of a fine unevenness structure of the cemented optical element of FIG. 3A. The fine unevenness structure is formed on a curved surface, while in FIG. 3B, it is simplified and illustrated as a flat surface.

In the present embodiment, the fine unevenness structure 2 is formed by a plurality of cone-shaped or pyramid-shaped holes (conical or pyramidal holes) 2*b*. Other points are the same as in the first embodiment. The shape of each of the conical or pyramidal holes 2*b* is not particularly limited as long as the width W thereof spreads toward the surface (side of third optical component 3). The shape of each of the conical or pyramidal holes 2*b* may be a circular cone-shape as illustrated in FIG. 3B or another cone-shape or pyramid-shape such as a pyramid-shape, an elliptical cone-shape, a circular truncated cone-shape, a truncated pyramid-shape, a truncated elliptical cone-shape, a bell-shape or the like.

According to the present embodiment, the same effect as the first embodiment can be obtained. Furthermore, in the present embodiment, by forming the fine unevenness structure 2 in a tapered shape, a refractive index gradation can be formed in the composite refractive index in the fine unevenness structure layer 5, and the refractive index can be changed continuously. Therefore, the reflectivity at the joining surface between the first optical component 1 and the third optical component 3 can be further reduced.

Third Embodiment

Figure 4:
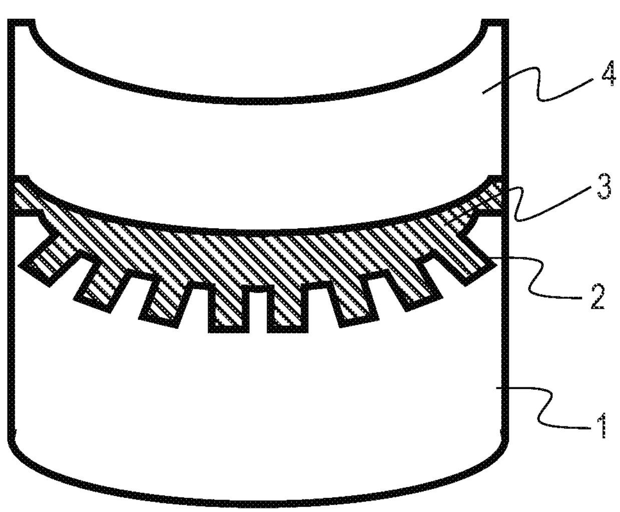
FIG. 4 is a diagram for illustrating a cemented optical element of the third embodiment.

The third embodiment of the present disclosure will be described with reference to FIG. 4. The parts already described in the first embodiment are given the same references and the redundant explanation is omitted. FIG. 4 is a schematic sectional view of the cemented optical element of the present embodiment.

In the present embodiment, the columnar holes 2*a* are provided so that the depth H direction thereof is parallel to the direction normal to the optical surface of the first optical component 1 (the optical surface assuming that the fine unevenness structure 2 is not formed). Other points are the same as in the first embodiment.

According to the present embodiment, the same effect as in the first embodiment can be obtained. Furthermore, in the present embodiment, since the fine unevenness structure 2 is formed in the direction normal to the optical surface of the first optical component 1, so that the joint strength between the first optical component 1 and the third optical component 3 becomes higher, and sufficient joint strength can be obtained even when the depth H of each of the columnar holes 2*a* is shallow.

Fourth Embodiment

Figure 5A:
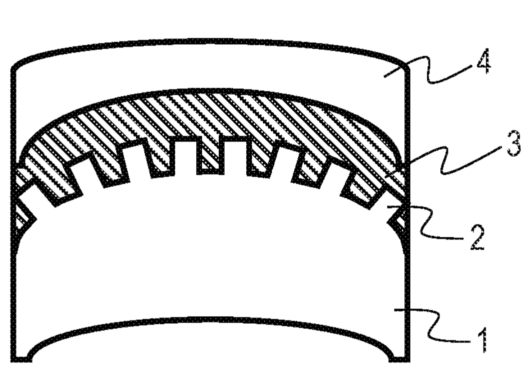
FIG. 5A is a diagram for illustrating a cemented optical element of the fourth embodiment.
Figure 5B:
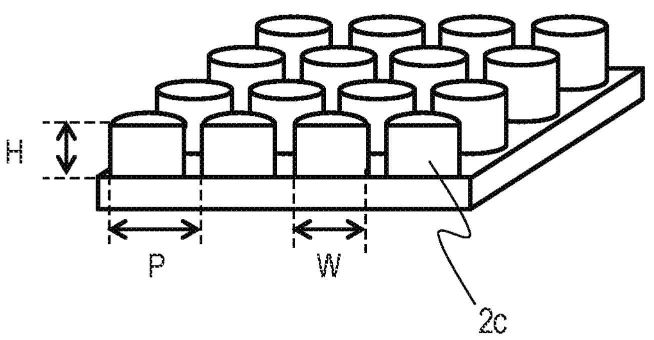
FIG. 5B is a diagram for illustrating a part of a fine unevenness structure of the cemented optical element of FIG. 5A.

The fourth embodiment of the present disclosure will be described with reference to FIG. 5A and FIG. 5B. The parts already described in the first embodiment are given the same references and the redundant explanation is omitted. FIG. 5A is a schematic sectional view of a cemented optical element of the present embodiment, and FIG. 5B is a schematic perspective view for illustrating a part of a fine unevenness structure of the cemented optical element of FIG. 5A. The fine unevenness structure is formed on a curved surface, while in FIG. 5B, it is simplified and illustrated as a flat surface.

In the present embodiment, the fine unevenness structure 2 is formed by a plurality of column-shaped protrusions (columnar protrusions) 2*c*. In addition, the columnar protrusions 2*c* are provided so that their center lines are parallel to the direction normal to the optical surface of the first optical component 1 as in the third embodiment. Other points are the same as in the first embodiment. The shape of each of the columnar protrusions 2*c* may be a cylindrical shape as shown in FIG. 5B, or any other columnar shape such as a prismatic shape or an elliptical cylinder-shape, as long as the width W thereof is almost constant in the height H direction.

The preferable range of the average value of the pitch P of the columnar protrusions 2*c* is similar to the preferable range of the average value of the pitch P of the first embodiment. The preferable range of the height H of each of the columnar protrusions 2*c* is similar to the preferable range of the depth H of the first embodiment. The optimum range of the width W of each of the columnar protrusions 2*c* varies depending on the wavelength of the light to be used and the combination of the refractive indices of the first optical component 1 and the third optical component 3, similar to the width W of the first embodiment. However, the width (P-W) of the narrowest part of the dent part of the first optical component 1 is preferably 20 nm or more. When the width (P-W) of the narrowest part is 20 nm or more, fracture of the bump part of the third optical component 3, which is an inverted structure of the dent part of the fine unevenness structure 2, due to the curing shrinkage of the adhesive is less likely to occur, and as a result, separation at the joining interface is unlikely to occur. The width (P-W) of the narrowest part of the uneven part of the first optical component 1 can be paraphrased as the shortest distance between the two of the columnar protrusions 2*c* adjacent to each other.

Figures 6A, 6B:
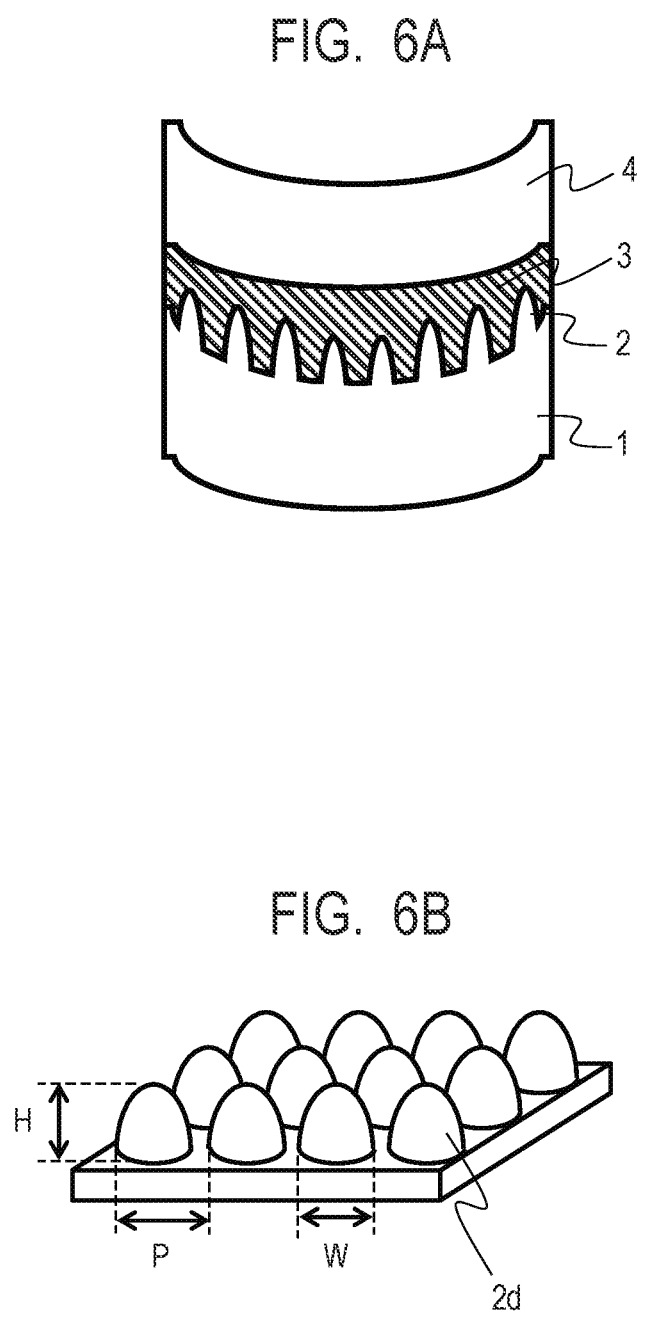

For comparison, a cemented optical element of Comparative Example 1 is illustrated in FIG. 6A and FIG. 6B. FIG. 6A is a schematic sectional view of the cemented optical element of Comparative Example 1, and FIG. 6B is a schematic perspective view for illustrating a part of a fine unevenness structure of the cemented optical element of FIG. 6A. The fine unevenness structure is formed on a curved surface, while in FIG. 6B, it is simplified and illustrated as a flat surface.

As shown in FIG. 6B, when the fine unevenness structure 2 is formed by a plurality of cone-like protrusions (conical protrusions) 2*d*, separation at the joining interface occurs in the joining step by the adhesive. It is considered that since each of the conical protrusions 2*d* has a thin tip, it cannot withstand the radial stress increase caused by the curing shrinkage of the adhesive in the joining step, and it is fractured and separation occurs. On the other hand, in the present embodiment, the fine unevenness structure 2 is formed by the columnar protrusions 2*c*, and each of the columnar protrusions 2*c* has an almost constant width W in the height H direction. Therefore, the fine unevenness structure 2 is highly rigid. For this reason, it is considered that the fine unevenness structure 2 is not fractured when the adhesive is cured and shrunk, and separation at the joining interface does not occur in the joining step.

According to the present embodiment, the same effect as in the first embodiment can be obtained. Furthermore, in the present embodiment, since the fine unevenness structure 2 is formed in the direction normal to the optical surface of the first optical component 1, so that the joint strength between the first optical component 1 and the third optical component 3 becomes higher as in the third embodiment, and sufficient joint strength can be obtained even when the height H of each of the columnar protrusions 2*c* is low.

Optical Apparatus and Image Pickup Apparatus

Figure 7:
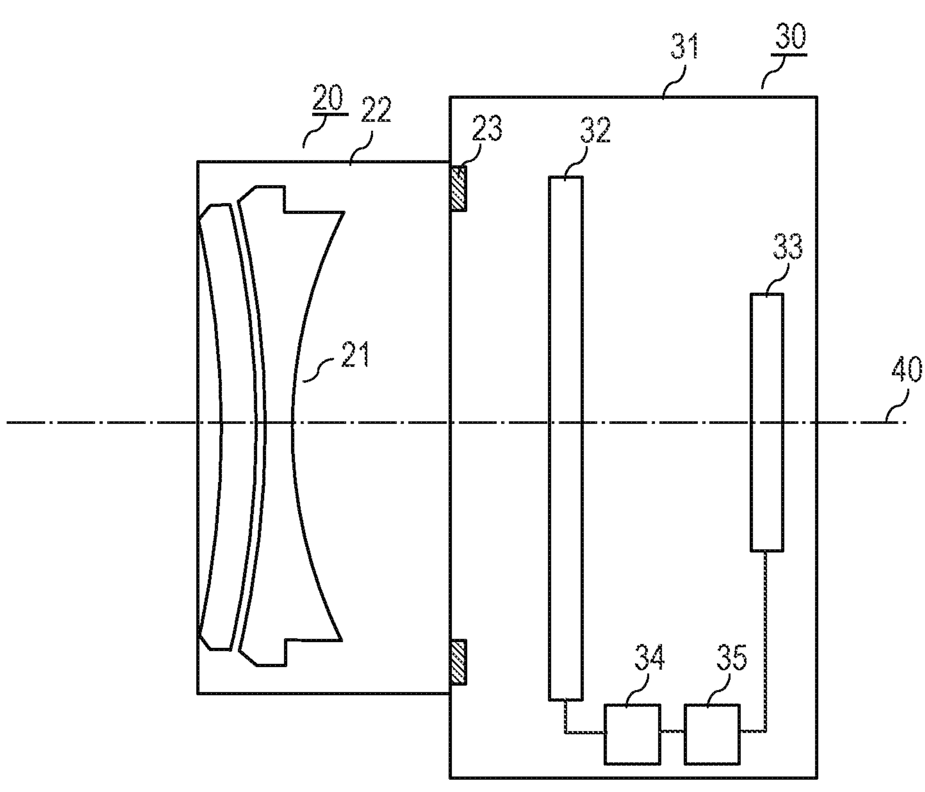
FIG. 7 is a diagram for illustrating an example of an image pickup apparatus.

A cemented optical element is used as an optical system or as a part of an optical system in an optical apparatus such as an image pickup apparatus (including a camera, a video camera, and the like), telescopes, binoculars, copiers, projectors, and the like. As an example, in FIG. 7, a schematic sectional view of an image pickup apparatus with a lens unit (optical system) mounted on an image pickup unit is illustrated. A cemented lens 21 as a cemented optical element is provided inside a housing 22 of a lens unit 20, and is fixed to an image pickup unit 30 by a mount 23. The image pickup unit 30 is provided with an image pickup element 33 that receives the light passing through the lens unit 20 and a shutter 32 in the housing 31. The image pickup element 33 is provided so that an optical axis 40 of the cemented lens 21 passes through the center of the image pickup element 33. Furthermore, a drive unit 34 that opens and closes the shutter 32, and a control unit 35 that controls the drive unit 34 and data read from the image pickup element 33 are provided.

EXAMPLES

Example 1

(1) Manufacturing the First Optical Component

As the first optical component 1, a resin lens (refractive index: 1.53) made of a COP resin was manufactured. A fine unevenness structure 2 was formed on the surface at the side of the joining interface of the resin lens by forming a plurality of the columnar holes 2*a* of the cylindrical shape, as illustrated in FIG. 1B, and making it into a periodic structure of the pitch P of 200 nm, the width W of 150 nm, and the depth H of 100 nm.

Figure 2A:
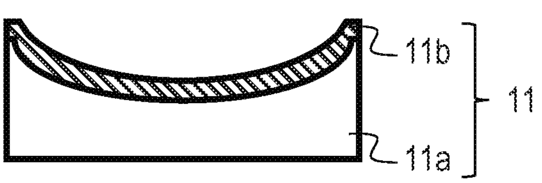
FIGS. 2A, 2B, 2C, 2D, 2E, 2F and 2G are diagrams for illustrating an example of a forming step of the fine unevenness structure of the cemented optical element of FIG. 1A.

First, as illustrated in FIG. 2A, an injection mold 11 was prepared. The injection mold 11 was configured of a stainless steel base part 11*a* and a nickel alloy mirror part 11*b*.

Figure 2B:
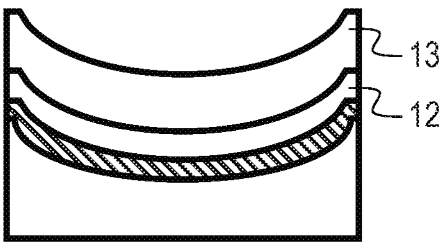

Next, as illustrated in FIG. 2B, a titanium film 12 and a silicon dioxide film 13 were formed by sputtering method. The thickness of the titanium film 12 was about 50 nm, and the thickness of the silicon dioxide film 13 was about 200 nm.

Figure 2C:
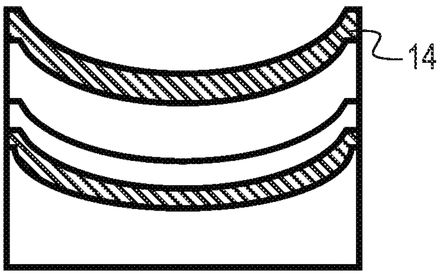

Then, as illustrated in FIG. 2C, a photoresist layer 14 was formed by the spin coat method. The spin coat condition was 3000 rpm/20 second, and the film thickness of the photoresist layer 14 was about 150 nm.

Figure 2D:
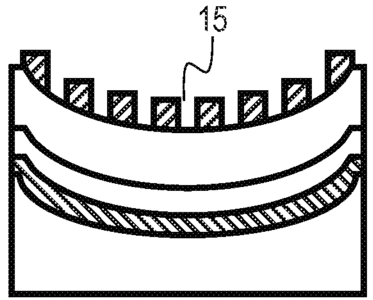

Then, as illustrated in FIG. 2D, a photoresist pattern 15 was obtained by exposing by the electron beam lithography and then developing. The photoresist pattern 15 was a cylindrical protrusion pattern with the pitch of 200 nm. The diameter of each of the cylindrical protrusions was 150 nm, and the height was about 150 nm, which was equivalent to the film thickness of the photoresist layer 14.

Figure 2E:
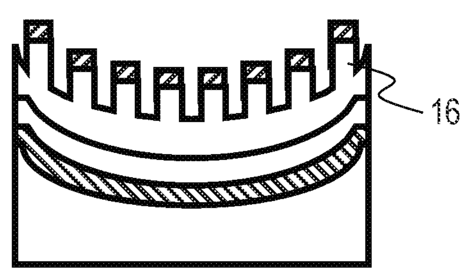

Then, as illustrated in FIG. 2E, the silicon dioxide film 13 exposed in the dent parts of the photoresist pattern 15 was dry-etched by the dry etching method using $CHF_3$ gas, to obtain a silicon dioxide pattern 16. The etching time was adjusted so that the height of the silicon dioxide pattern 16 was about 100 nm.

Figure 2F:
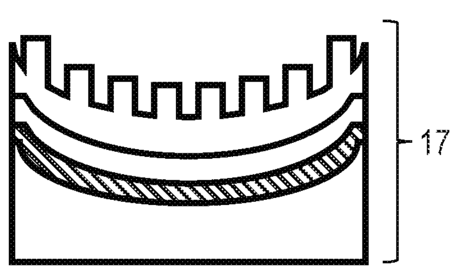

Next, as illustrated in FIG. 2F, the photoresist pattern 15 was removed by the oxygen ashing method. Then, a monomolecular release film (not illustrated) was formed on the surface of the silicon dioxide pattern 16 to obtain a fine structure mold 17.

Figure 2G:
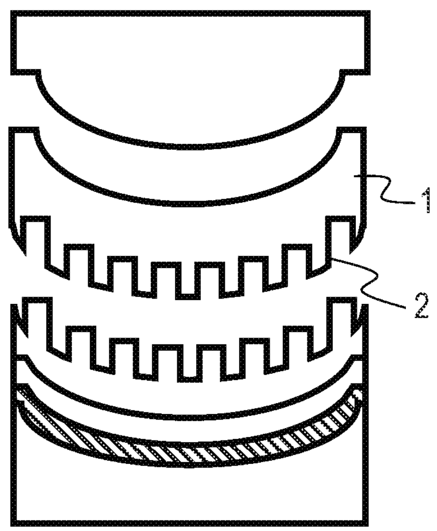

Then, as illustrated in FIG. 2G, by injection-molding the COP resin through use of the fine structure mold 17, the fine unevenness structure 2 was transferred to the surface simultaneously with the molding of the resin lens as the first optical component 1.

(2) Joining the First Optical Component and the Second Optical Component

The surface of the resin lens obtained above, on which the fine unevenness structure 2 was formed, and the glass lens, which was the second optical component 4, were opposed to each other, and both were joined through use of an epoxy adhesive. The third optical component 3 formed by curing the adhesive had a thickness of about 10 μm and a refractive index of 1.60.

(3) Evaluation

When the shape of the fine unevenness structure 2 of the first resin lens obtained above was evaluated through use of an electron microscope, the almost inverted structure of the fine unevenness structure of the fine structure mold 17 was obtained, and the fine unevenness structure 2 of the first resin lens was formed by a plurality of columnar holes 2*a* of the cylindrical shape. The pitch P of the columnar holes 2*a* was 200 nm, the width W of each of the columnar holes 2*a* was 150 nm, and the depth H was 100 nm. The results are shown in Table 1.

The reflectivity at the interface between the first optical component 1 and the third optical component 3 of the cemented optical element obtained above was measured by a spectrophotometer (V-7300 DS manufactured by JASCO Corporation). The average reflectivity at the wavelength from 400 nm to 700 nm was about 0.01%. Moreover, separation at the joining interface did not occur in the joining step of the first optical component 1 and the second optical component 4. The results are shown in Table 1.

Examples 2 to 13 and Comparative Example 1

The cemented optical elements were manufactured in the same manner as in Example 1, except that the material of the resin lens, the structure of the fine unevenness structure, and the adhesive were changed as showy in Table 1, and evaluated in the same manner as in Example 1. The results are shown in Table 1.

In Comparative Example 1, when the material of the resin lens was changed to PS, PMMA, and PC, respectively, and the adhesive was changed to an acrylic adhesive to manufacture the cemented optical elements, separation occurred in the joining step in all cases as in Comparative Example 1.

TABLE 1

| | Fine unevenness structure | | | | Resin lens | | Adhesive | | | | Separation |
|---|---|---|---|---|---|---|---|---|---|---|---|
| | Shape | Pitch [nm] | Diameter [nm] | Height (nm) | Material | Refractive index | Material | Refractive index | Thickness [μm] | Reflectivity | step in joining |
| Example 1 | FIG. 1B | 200 | 150 | 100 | COP | 1.53 | Epoxy | 1.6 | 10 | 0.01% | No |
| Example 2 | FIG. 3B | 250 | 200 | 200 | PS | 1.59 | Acryl | 1.88 | 8 | 0.02% | No |
| Example 3 | FIG. 4 | 100 | 75 | 30 | PMMA | 1.49 | Epoxy | 1.44 | 15 | 0.04% | No |
| Example 4 | FIG. 5B | 800 | 225 | 100 | PC | 1.58 | Acryl | 1.68 | 80 | 0.01% | No |
| Example 5 | FIG. 4 | 200 | 150 | 100 | COP | 1.58 | Epoxy | 1.6 | 10 | 0.01% | No |
| Example 6 | FIG. 4 | 200 | 150 | 100 | COP | 1.63 | Acryl | 1.38 | 10 | 0.01% | No |
| Example 7 | FIG. 4 | 200 | 150 | 100 | PS | 1.59 | Epoxy | 1.6 | 10 | 0.01% | No |
| Example 8 | FIG. 4 | 200 | 150 | 100 | PS | 1.59 | Acryl | 1.38 | 10 | 0.01% | No |
| Example 9 | FIG. 4 | 200 | 150 | 100 | PMMA | 1.49 | Epoxy | 1.6 | 10 | 0.01% | No |
| Example 10 | FIG. 4 | 200 | 150 | 100 | PMMA | 1.49 | Acryl | 1.38 | 10 | 0.01% | No |
| Example 11 | FIG. 4 | 200 | 150 | 100 | PC | 1.58 | Epoxy | 1.6 | 10 | 0.01% | No |
| Example 12 | FIG. 4 | 200 | 150 | 100 | PC | 1.58 | Acryl | 1.38 | 10 | 0.01% | No |
| Example 13 | FIG. 4 | 150 | 105 | 80 | PC | 1.58 | Epoxy | 1.6 | 10 | 0.02% | No |
| Comparative Example 1 | FIG. 6B | 250 | 200 | 200 | COP | 1.58 | Epoxy | 1.6 | 10 | 0.01% | Yes |

According to the present disclosure, a cemented optical element with high joint strength and low reflectivity at the joining interface can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-043720, filed Mar. 18, 2022, which is hereby incorporated by reference herein in its entirety.

What is claimed is:

1. A cemented optical element comprising:

a first optical component;

a second optical component; and a third optical component that contains a resin and is sandwiched between the first optical component and the second optical component, wherein the first optical component contains a resin and has a fine unevenness structure on at least a part of a surface in contact with the third optical component, wherein the fine unevenness structure is formed by a plurality of holes or columnar protrusions, and wherein each of the holes has a depth of 30 nm or more and 100 nm or less or each of the columnar protrusions has a height of 30 nm or more and 100 nm or less.

2. The cemented optical element according to claim 1, wherein the second optical component contains a resin and has a fine unevenness structure on at least a part of a surface in contact with the third optical component, wherein the fine unevenness structure is formed by a plurality of holes or columnar protrusions.

3. The cemented optical element according to claim 1, wherein the fine unevenness structure is formed with an average pitch of 300 nm or less.

4. The cemented optical element according to claim 1, wherein the fine unevenness structure is formed with an average pitch of 50 nm or more.

5. The cemented optical element according to claim 1, wherein a depth direction of the holes or a height direction of the columnar protrusions is parallel to a direction normal to an optical surface of the first optical component.

6. The cemented optical element according to claim 1, wherein the holes are column-shaped holes.

7. The cemented optical element according to claim 1, wherein the fine unevenness structure is a periodic structure.

8. An optical apparatus comprising:

a housing; and a cemented optical element provided inside the housing, wherein the cemented optical element comprises:

a first optical component, a second optical component, and a third optical component that contains a resin and is sandwiched between the first optical component and the second optical component, wherein the first optical component contains a resin and has a fine unevenness structure on at least a part of a surface in contact with the third optical component, wherein the fine unevenness structure is formed by a plurality of holes or columnar protrusions, and wherein each of the holes has a depth of 30 nm or more and 100 nm or less or each of the columnar protrusions has a height of 30 nm or more and 100 nm or less.

9. An image pickup apparatus comprising:

an optical apparatus; and an image pickup element that receives incident light through the optical apparatus, wherein the optical apparatus comprises a housing and a cemented optical element provided inside the housing, wherein the cemented optical element comprises a first optical component, a second optical component, and a third optical component that contains a resin and is sandwiched between the first optical component and the second optical component, wherein the first optical component contains a resin and has a fine unevenness structure on at least a part of a surface in contact with the third optical component, wherein the fine unevenness structure is formed by a plurality of holes or columnar protrusions, and wherein each of the holes has a depth of 30 nm or more and 100 nm or less or each of the columnar protrusions has a height of 30 nm or more and 100 nm or less.

* * * * *